United States Patent
Alexander et al.

(10) Patent No.: US 7,975,130 B2
(45) Date of Patent: Jul. 5, 2011

(54) METHOD AND SYSTEM FOR EARLY INSTRUCTION TEXT BASED OPERAND STORE COMPARE REJECT AVOIDANCE

(75) Inventors: Khary J. Alexander, Poughkeepsie, NY (US); Fadi Y. Busada, Poughkeepsie, NY (US); Bruce C. Giamei, Poughkeepsie, NY (US); David S. Hutton, Tallahassee, FL (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 12/034,042

(22) Filed: Feb. 20, 2008

(65) Prior Publication Data

US 2009/0210675 A1    Aug. 20, 2009

(51) Int. Cl.
*G06F 9/312* (2006.01)
(52) U.S. Cl. .................................. 712/225; 712/219
(58) Field of Classification Search .................. None
See application file for complete search history.

(56) References Cited

U.S. PATENT DOCUMENTS

| | | | |
|---|---|---|---|
| 4,638,429 A | | 1/1987 | Watabe et al. |
| 5,467,473 A | * | 11/1995 | Kahle et al. ............ 712/23 |
| 5,781,752 A | * | 7/1998 | Moshovos et al. ........ 712/216 |
| 5,881,307 A | | 3/1999 | Park et al. |
| 5,987,595 A | * | 11/1999 | Yoaz et al. ............ 712/216 |
| 6,108,770 A | * | 8/2000 | Chrysos et al. ......... 712/216 |
| 6,249,862 B1 | | 6/2001 | Chinnakonda et al. |
| 6,622,237 B1 | | 9/2003 | Keller et al. |
| 6,865,645 B1 | | 3/2005 | Shum et al. |
| 6,912,648 B2 | * | 6/2005 | Hammarlund et al. ..... 712/219 |
| 6,931,515 B2 | | 8/2005 | Ross et al. |
| 7,062,638 B2 | | 6/2006 | Yoaz et al. |
| 7,181,598 B2 | | 2/2007 | Jourdan et al. |
| 7,441,107 B2 | * | 10/2008 | Hammond et al. ......... 712/225 |
| 2003/0196075 A1 | * | 10/2003 | Akkary et al. ............ 712/218 |
| 2003/0217251 A1 | * | 11/2003 | Jourdan et al. ........... 712/225 |
| 2007/0288726 A1 | * | 12/2007 | Luick ..................... 712/216 |

OTHER PUBLICATIONS z/Architecture, Principles of Operation, Sixth Edition, Apr. 2007, Publication No. SA22-7832-05, copyright IBM Corp. 1990-2007, pp. 1-1218.

* cited by examiner

*Primary Examiner* — Eric Coleman
(74) *Attorney, Agent, or Firm* — Cantor Colburn LLP; John Campbell

(57) ABSTRACT

A method and system for early instruction text based operand store compare avoidance in a processor are provided. The system includes a processor pipeline for processing instruction text in an instruction stream, where the instruction text includes operand address information. The system also includes delay logic to monitor the instruction stream. The delay logic performs a method that includes detecting a load instruction following a store instruction in the instruction stream, comparing the operand address information of the store instruction with the load instruction. The method also includes delaying the load instruction in the processor pipeline in response to detecting a common field value between the operand address information of the store instruction and the load instruction.

14 Claims, 3 Drawing Sheets

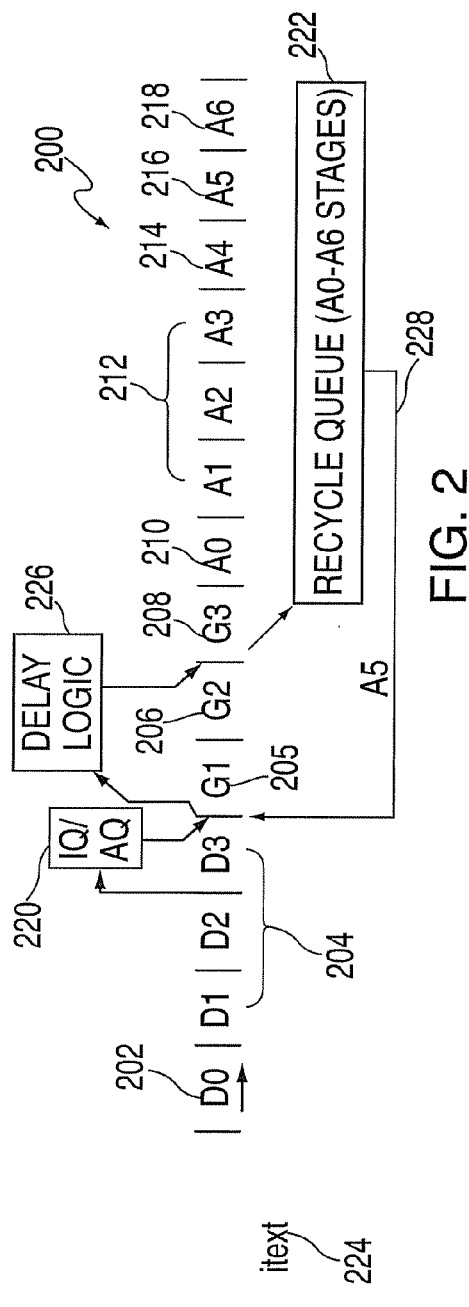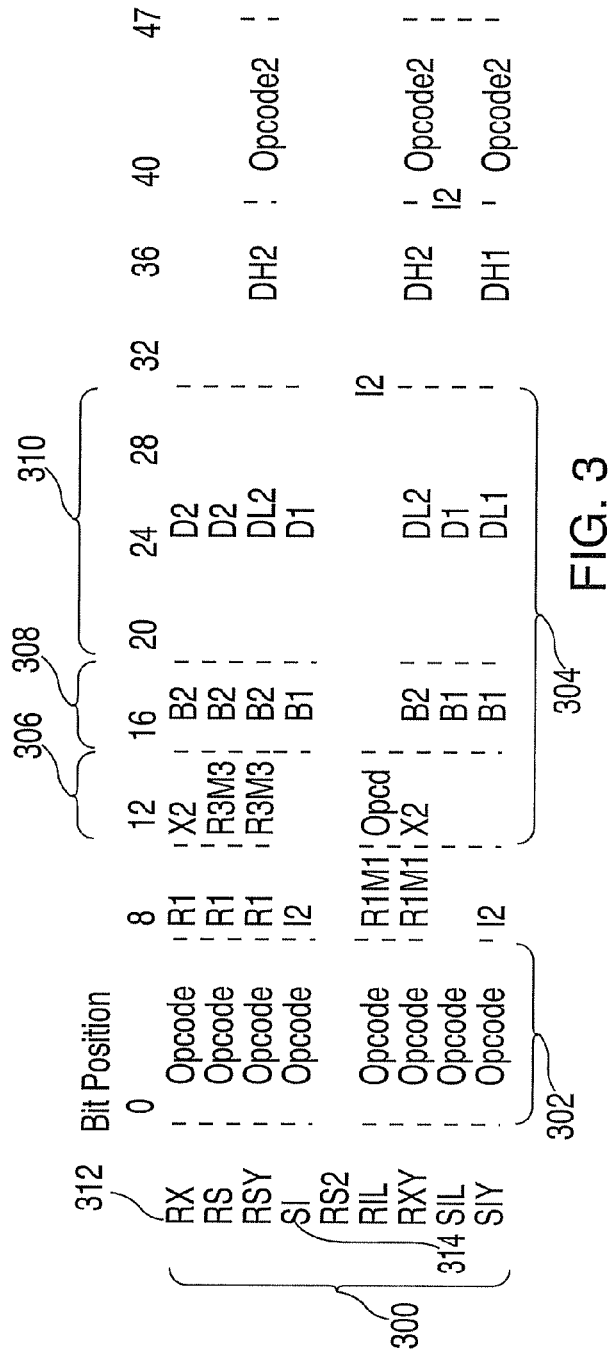

METHOD AND SYSTEM FOR EARLY INSTRUCTION TEXT BASED OPERAND STORE COMPARE REJECT AVOIDANCE

BACKGROUND OF THE INVENTION

This invention relates generally to improving computer system efficiency, and more particularly to the reduction of operand store compare rejects penalties through instruction text based early detection.

As computer system designers seek to continually improve processor performance, it is beneficial to develop approaches that reduce cycles per instruction (CPI). Operand store compare (OSC) penalties can be a large contributor to high CPI numbers. OSC is defined as encountering an instruction with an operand to store data to memory followed by an instruction to load the data from the memory before the stored data actually reaches the memory. As a stream of instructions progresses through a processor pipeline, various control units perform tasks such as fetching instructions, dispatching instructions, calculating address values, accessing registers, fetching operands, executing instructions, checking for error conditions, and retiring the instructions including storing the results. When instructions advance deeper through the pipeline, dependency conditions, errors, incorrectly predicted branches, and the like, can stall progress of the instructions through the pipeline as the conditions are handled. The problem with OSC is that occurrence of the condition is unknown until a cache address is formed, which may be after the instruction has already been dispatched, requiring costly stall/reset mechanisms. For instance, when load store (LS) logic detects an OSC, it then rejects/recycles the load instruction and holds it from dispatching again until the storage data reaches a point where it can be bypassed (or read) by the load instruction. The penalty of such a reject can be many (e.g., 9) cycles of unused processing time. Compilers that generate the instructions typically try to distance instructions that store and load the same data sufficiently to minimize the OSC penalty. However, if the distance between the store and load is not large enough, the load can still be rejected in the processor pipeline. The distance between two instructions is defined by the number of cycles between dispatches of the two instructions. The distance is zero if the store and load are grouped and dispatched together, for instance, in a super-scalar architecture.

It would be beneficial to develop an approach to identify an OSC early in the pipeline to minimize associated delays. Such an approach should not require additional memory for storing accumulated instruction history, but take advantage of access to instruction text as it moves through pipeline stages. Accordingly, there is a need in the art for early instruction text based OSC avoidance.

BRIEF SUMMARY OF THE INVENTION

An exemplary embodiment includes a system for early instruction text based operand store compare avoidance in a processor. The system includes a processor pipeline for processing instruction text in an instruction stream, where the instruction text includes operand address information. The system also includes delay logic to monitor the instruction stream. The delay logic performs a method that includes detecting a load instruction following a store instruction in the instruction stream, comparing part of the instruction text related to operand address information of the store instruction with the load instruction. The method also includes delaying the load instruction in the processor pipeline in response to detecting a common field value between the operand address information of the store instruction and the load instruction.

Another exemplary embodiment includes a method for early instruction text based operand store compare avoidance in a processor pipeline. The method includes detecting a load instruction following a store instruction in an instruction stream. The load instruction and the store instruction include instruction text with operand address information. The method further comprises comparing the part of the instruction text related to the operand address information of the store instruction with the load instruction, and delaying the load instruction in the processor pipeline in response to detecting a common field value between the operand address information of the store instruction and the load instruction.

A further exemplary embodiment includes a system for early instruction text based operand store compare avoidance in a processor pipeline. The system includes an instruction dispatcher in communication with an address generator and a load store unit, where the address generator creates addresses for the load store unit to access memory. The system also includes an instruction decoder sending instruction text to an instruction grouping. The instruction grouping is in communication with the instruction dispatcher and establishes dependencies between an operand in the instruction text of a load instruction following a store instruction in the processor pipeline.

BRIEF DESCRIPTION OF THE DRAWINGS

Referring now to the drawings wherein like elements are numbered alike in the several FIGURES:

FIG. 2 depicts a block diagram of an instruction processor pipeline, delay logic and recycle queue in accordance with an exemplary embodiment;

FIG. 3 depicts instruction formats in accordance with an exemplary embodiment.

DETAILED DESCRIPTION OF EXEMPLARY EMBODIMENTS

An exemplary embodiment of the present invention provides early instruction text based operand store compare (OSC) avoidance. An OSC condition can occur when one instruction in a processor pipeline includes an operand targeted to store data to memory, and a second instruction attempts to load the data from the memory before the store completes. In an exemplary embodiment, instruction text in an instruction stream is accessed to detect potential OSC conditions early in a processor pipeline. Early detection is performed prior to address generation to minimize wasted time in recycling an instruction that has progressed deep into the processor pipeline. This is achieved by taking advantage of instruction formatting that is common across multiple instructions. For example, comparing bits from instruction text that provide operand address information, such as index, base, and displacement fields, provides information to determine if an OSC is likely to occur in the instruction stream.

Figure 1:
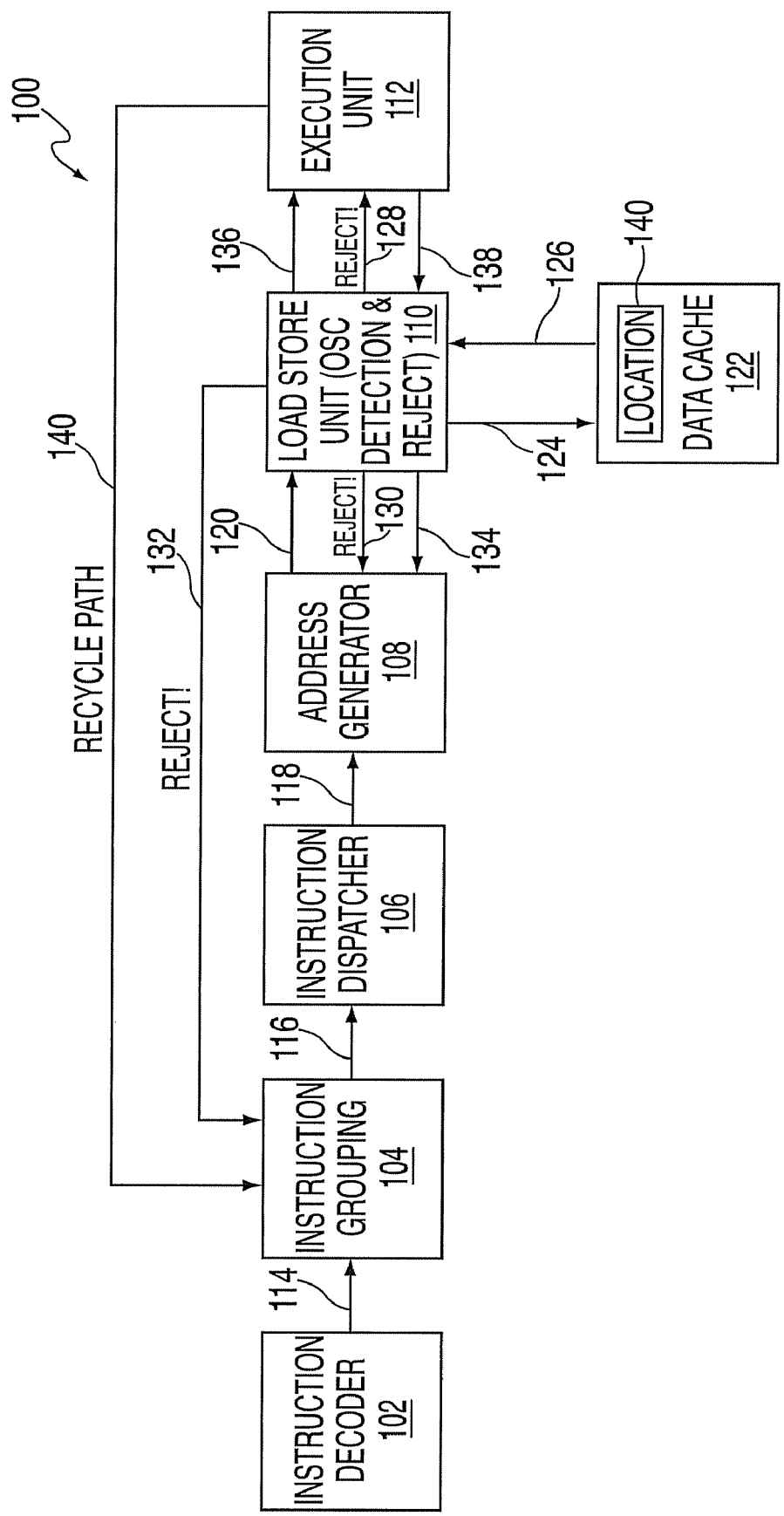
FIG. 1 depicts a block diagram of a system for early instruction text based operand store compare avoidance in accordance with an exemplary embodiment.

Turning now to FIG. 1, a system 100 is depicted that includes multiple functional units to support pipelining of instructions in processing circuitry. Pipelining can increase instruction execution throughput by performing stages such as fetching, decoding, execution and completion concurrently for multiple instructions in an instruction stream. In an exemplary embodiment, functional units in the system 100 include: instruction decoder 102, instruction grouping 104, instruction dispatcher 106, address generator 108, load store unit 110, and execution unit 112. It will be understood that additional functional units can be included in the system 100 which are not depicted, such as an instruction fetching unit, a completion unit, a recovery unit, and the like. Multiple communication paths can be used to communicate between each of the functional units 102-112. The communication paths may vary in bus width (single-bit to multi-bit) and can be unidirectional or bidirectional. For example, path 114 passes instruction text (itext) in an instruction stream from the instruction decoder 102 to instruction grouping 104. The instruction grouping 104 determines whether instructions can be grouped together for parallel processing, for example, using a super-scalar architecture. The instruction grouping 104 can create itext based OSC dependencies on older store instructions that have progressed into later pipeline stages (e.g., in functional units 106-112). The instruction grouping 104 passes itext including any groups formed via path 116 to instruction dispatcher 106. In an exemplary embodiment, the instruction dispatcher 106 delays dispatching of a load instruction when a store instruction with a potential OSC condition has been identified. The instruction dispatcher 106 dispatches itext, maintaining dependencies via path 118 to address generator 108. The address generator 108 determines actual address values, which may be calculated using a combination of base, index, and displacement fields from itext in the instruction stream. The address generator 108 sends itext with operand address information to the load store unit 110 via path 120.

The load store unit 110 can access a data cache 122 via path 124 and receives data from the data cache 122 via path 126. In an exemplary embodiment, the load store unit 110 performs actual OSC detection, monitoring actual load and store accesses to the data cache 122. When the load store unit 110 detects that an operand load has been requested for a location 140 in the data cache 122 that has not completed a store operation, the load store unit 110 declares a reject condition for the associated instruction, since it cannot complete. The reject condition is forwarded to execution unit 112 via path 128 and returned to address generator 108 via path 130 and to instruction grouping 104 via path 132. Additionally, the load store unit 110 can feed information back to the address generator 108 via path 134, and forward information to the execution unit 112 via path 136. The execution unit 112 can also send data to the load store unit 110 via path 138 and send itext back to the instruction grouping 104 via recycle path 140. Although the paths 130 and 134, as well as paths 136 and 128, are depicted as separate paths, it will be understood that paths can be combined within the scope of the invention.

Turning now to FIG. 2, a block diagram of an instruction stream in a processor pipeline 200 is depicted in accordance with an exemplary embodiment. Stages of the processor pipeline 200 include D0 202 to transfer fetched instructions for decoding, D1 through D3 204 to decode instructions (e.g., instruction decoder 102 of FIG. 1), G1 205 and G2 206 to group instructions (e.g., grouping stages in instruction grouping 104 of FIG. 1), G3 208 to dispatch instructions (e.g., instruction dispatcher 106 of FIG. 1), A0 210 to perform address generation (e.g., address generator 108 of FIG. 1), A1 through A3 212 for cache access (e.g., load store unit 110 of FIG. 1), A4 214 to execute instructions (e.g., execution stage 112 of FIG. 1), A5 216 to start the put away of results or recycle instructions on failure conditions, and A6 218 to retire instructions.

As instructions advance in decoding stages D1 through D3 204, an instruction queue and address queue (IQ/AQ) 220 may be used to expand itext 224 into greater levels of detail for processing. The expansion adds additional control and status information associated with the itext 224. Delay logic 226 monitors movement of the itext 224 into the G1 205 stage and identifies fields that may be used for operand address calculation. If a store instruction is identified, the delay logic 226 monitors for a subsequent load instruction with potential overlap in operand fields that include operand address information. When an overlap is detected, the delay logic can hold the load instruction for up to a designated number of cycles to provide adequate time for the Store instruction to at least be able to support forwarding to a dependent Load. Delaying the Load instruction proactively, rather than waiting for an actual non-forwardable OSC to be detected later in the pipeline once address generation is performed, prevents rejection of the load instruction. This Load to Store dependency tracking and stalling is applied for each Store in the window of influence. The delay logic 226 may be performed in instruction decoder 102, instruction grouping 104, or instruction dispatcher 106 in FIG. 1. The instruction queue and address queue (IQ/AQ) 220 can be used to store decoded instruction text if the grouping stages are blocked.

Recycle queue 222 retains instruction information for use in the cases where a retry of an instruction if necessary. Upon determining that there is a need to reject the dependent Load, the rejected instruction is returned to an earlier position in the processor pipeline 200 via recycle path 228. In an exemplary embodiment, actual OSC rejects due to OSC occurs in A5 216.

Turning now to FIG. 3, instruction formats 300 are depicted in accordance with an exemplary embodiment. Each row in the instruction formats 300 includes instruction text (itext) formatting for a particular instruction format in the instruction formats 300. Fields are defined relative to bit positions. For example, bits positions 0 to 7 represent opcodes 302. Bit positions 12 through 31 can contain operand address information 304 that may also include other information depending upon each instruction format. The operand address information 304 may include operands for the opcodes 302, such as an index field 306, a base field 308, and/or a displacement field 310. The index field 306, base field 308, and/or displacement field 310 can be combined to form a value used to detect a potential OSC. The index and base fields, 306 and 308, represent the number of a General Purpose Register (GPR) to be utilized in Address generation. In cases where either field is not utilized by the instruction it is set to "0000". Each format in the instructions formats 300 may provide formatting for both load and store instructions. For example, the delay logic 226 of FIG. 2 can identify load and store instructions formatted in RX format 312 and directly compare the operand address information 304 associated with each instruction, a subset of fields (e.g., base fields 308) or a combination of fields to detect a potential OSC. The identification and comparison of operand address information 304 for load and store instructions can also be performed across formats, such as a load instruction in RX format 312 and a store instruction in SI 314 format. The delay logic 226 may perform conditional comparisons that target specific instruction formats 300 and perform comparisons when the instruction formats 300 include specific fields, e.g., index fields 306.

Figure 4:
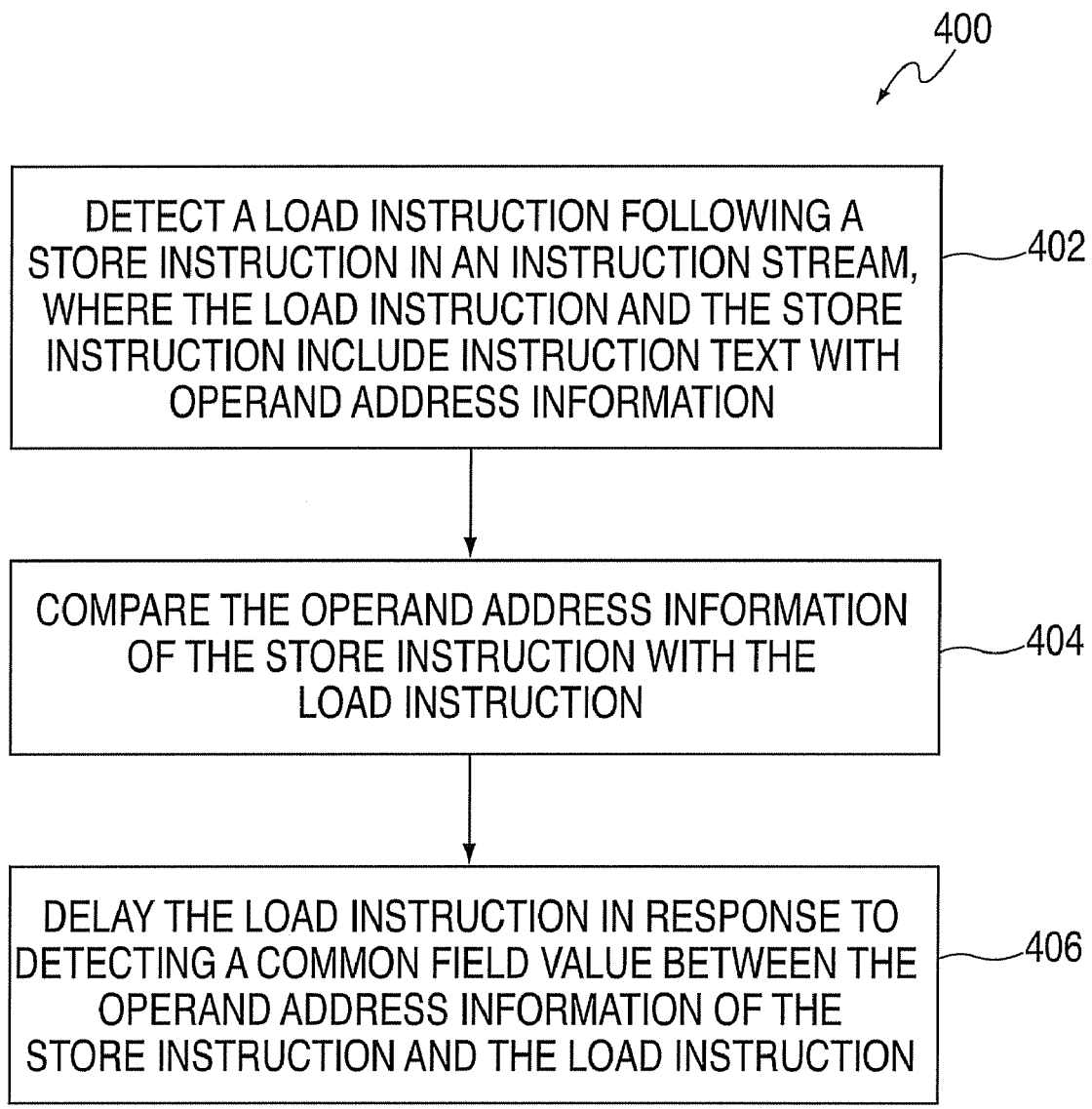
FIG. 4 depicts a process for early instruction text based operand store compare avoidance in accordance with an exemplary embodiment.

Turning now to FIG. 4, a process 400 for early instruction text based operand store compare avoidance will now be described in reference to FIGS. 1-3 and in accordance with an exemplary embodiment. At block 402, delay logic 226 detects a load instruction following a store instruction in an instruction stream. The load instruction and the store instruction include itext 224 with operand address information 304. For example, the delay logic 226 may be included in the instruction grouping 104.

At block 404, the delay logic 226 compares the operand address information 310 of the store instruction with the load instruction. The compare can be performed across the entire operand address information 310 or a subset thereof. The compare may identify common fields between the load and store instructions for comparison. The delay logic 226 may also distinguish between instruction formats 300 such that non-existing fields or fields with alternate definitions are not compared to each other.

At block 406, the delay logic 226 delays the load instruction in the processor pipeline 200 in response to detecting a common field value between the operand address information 304 of the store instruction and the load instruction. For example, the base field 308 of the store instruction may target the same location 140 as operand address information 304 of the load instruction. In an exemplary embodiment, the delay of the load instruction is performed prior to dispatching the load instruction. In determining a number of cycles to delay the load instruction, the delay logic 226 can calculate the number of cycles between the load instruction and the store instruction, and establishes the delay period as a minimum value delay to avoid a reject minus the number of cycles between the load instruction and the store instruction. Identifying a potential OSC early in the processor pipeline 200 and delaying the load instruction prevents the longer delay associated with the recycle queue 222 that occurs when an actual non-forwardable OSC is allowed to occur. A pre-emptive delay for a potential OSC can prevent an actual, more costly OSC reject from occurring. Alternatively, in rare cases based on implementation, the pre-dispatch delay introduced by the itext based scheme may be unnecessary because an address generator (AGEN) shows that there is actually no overlap.

It will be understood that the process 400 can be applied to any processing circuitry that incorporates a processor pipeline. For example, process 400 can be applied to various digital designs, such as a microprocessor, an application specific integrated circuit (ASIC), a programmable logic device (PLD), or other such digital devices capable of processing instructions. Therefore, the system 100 of FIG. 1 can represent a variety of digital designs that incorporate processing circuitry.

Technical effects and benefits include early instruction text based operand store compare avoidance in a processor pipeline. In a normal compiled program, instructions writing and reading the same storage area generally utilize the same registers and displacement. Unlike other prediction schemes, additional loading or memory beyond that already included as part of a processor pipeline need not be used. Instead, readily available itext being staged in support of a general recycle scheme can be analyzed to act preemptively before an actual OSC occurs. The invention attempts to avoid the OSC recycle penalty by delaying the dispatch of a load. In one embodiment, up to 9 cycles of recycle time are replaced by up to 6 cycles of load instruction delay relative to an older store instruction. Thus, at least 8 cycles can be saved when a load instruction would otherwise be dispatched 5 cycles after the store instruction. The net 8 cycle savings comes from delaying the load instruction by an additional cycle and avoiding the 9 cycles of recycle time.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for early instruction text based operand store compare avoidance in a processor, the system comprising:
   a processor pipeline for processing instruction text in an instruction stream, wherein the instruction text includes operand address information; and
   delay logic to monitor the instruction stream, the delay logic performing a method comprising:
      detecting a load instruction following a store instruction in the instruction stream;
      comparing the operand address information of the store instruction with the load instruction;
      determining a delay period for delaying the load instruction based on when the store instruction can support forwarding in response to detecting a common field value between the operand address information of the store instruction and the load instruction; and
      delaying the load instruction in the processor pipeline for the delay period.

2. The system of claim 1 wherein the common field value includes one or more of an index field, a base field, and a displacement field.

3. The system of claim 1 further wherein comparing the operand address information of the store instruction and the load instruction is performed as a function of instruction formats.

4. The system of claim 1 wherein the delaying is performed prior to dispatching the load instruction.

5. The system of claim 1 wherein the delay logic accesses a grouping stage to monitor the instruction stream.

6. The system of claim 1 wherein the determining of the delay period further comprises:
   calculating a number of cycles between the load instruction and the store instruction; and
   establishing a delay period for delaying the load instruction as a minimum delay value minus the number of cycles between the load instruction and the store instruction.

7. The system of claim 1 further comprising a recycle queue to return instruction text to an earlier stage in the processor pipeline, wherein the delaying is performed prior to the load instruction reaching the recycle queue.

8. A method for early instruction text based operand store compare avoidance in a processor pipeline, the method comprising:
   detecting a load instruction following a store instruction in an instruction stream, wherein the load instruction and the store instruction are comprised of instruction text including operand address information;
   comparing the operand address information of the store instruction with the load instruction;
   determining a delay period for delaying the load instruction based on when the store instruction can support forwarding in response to detecting a common field value between the operand address information of the store instruction and the load instruction; and delaying the load instruction in the processor pipeline for the delay period.

9. The method of claim 8 wherein comparing the operand address information of the store instruction and the load instruction is performed as a function of instruction formats.

10. The method of claim 8 wherein the common field value includes one or more of an index field, a base field, and a displacement field.

11. The method of claim 8 wherein the delaying is performed prior to dispatching the load instruction.

12. The method of claim 8 wherein the delay logic accesses a grouping stage to monitor the instruction stream.

13. The method of claim 8 wherein the determining of the delay period further comprising:

calculating a number of cycles between the load instruction and the store instruction; and establishing a delay period for delaying the load instruction as a minimum delay value minus the number of cycles between the load instruction and the store instruction.

14. The method of claim 8 wherein the delaying is performed prior to the load instruction reaching a recycle queue capable of returning instruction text to an earlier stage in the processor pipeline.

* * * * *